United States Patent [19]

Schmid

[11] Patent Number: 4,985,217

[45] Date of Patent: Jan. 15, 1991

[54] METHOD FOR REMOVING NITROGEN OXIDES FROM GASES

[76] Inventor: Peter J. Schmid, Neustiftgasse 93, A-1070 Vienna, Austria

[21] Appl. No.: 505,039

[22] Filed: Apr. 5, 1990

[30] Foreign Application Priority Data

Oct. 25, 1989 [AT] Austria .............................. A2471/89
Feb. 1, 1990 [AT] Austria ................................ A207/90

[51] Int. Cl.$^5$ ...................... C01B 21/00; C01B 21/22; C01B 21/24
[52] U.S. Cl. ..................................... 423/235; 423/400
[58] Field of Search ..................... 423/235, 235 D, 400

[56] References Cited

U.S. PATENT DOCUMENTS 3,453,071  7/1969  Schmitt et al. ...................... 423/235
4,232,175  11/1980  Smith et al. ...................... 423/400 X

*Primary Examiner*—Gregory A. Heller
*Attorney, Agent, or Firm*—Kurt Kelman

[57] ABSTRACT

Method for removing nitrogen oxides from gases in which, at first, the molar ratio between NO and $NO_2$ is set to 1 in said gas and subsequently the nitrogen oxides are absorbed in a hydrous ammonia solution, whereby ammonium nitrate is formed. In order to achieve the desired molar ratio in a simple manner, it is intended for setting the molar ratio between NO and $NO_2$, to inject $NO_2$ into the gas in a controlled manner, said $NO_2$ having been formed by the reaction between ammonium nitrate with a strong acid.

1 Claim, No Drawings

METHOD FOR REMOVING NITROGEN OXIDES FROM GASES

The invention refers to a method for removing nitrogen oxides from gases in which, at first, the molar ratio of NO to $NO_2$ in such gas is set to 1 and that subsequently the nitrogen oxides are absorbed in a hydrous ammonia solution, whereby ammonium nitrate is formed.

From the U.S. Pat. No. 3,453,071 a method is known for removing nitrogen oxides from flue gases, said method consisting in introducing the gas to be purified into a hydrous solution of ammonia and ammonium nitrate at a temperature of about 20° C. to 30° C. In such a solution the nitrogen oxides react with ammonia to form ammonium nitrite which subsequently oxidizes to ammonium nitrate. Such a reaction requires the nitrogen monooxide and nitrogen dioxide to be present in a molar ratio of 1. The U.S. Pat. No. 3,453,071 further states that such a desired molar ratio is to be achieved by various means, such as by a selective supply of the nitrogen oxide, said nitrogen oxide being present in a deficit, or by oxidation of nitrogen monooxide to nitrogen dioxide or, vice versa, by reducing nitrogen dioxide to nitrogen monooxide.

In general practice, however, flue gases resulting from burning processes usually contain a relatively large proportion of nitrogen monooxide, whereas, in comparison thereto, the proportion of nitrogen dioxide is low. In order to achieve the desired molar ratio of 1 it would be necessary to either introduce additional nitrogen dioxide into the flue gases or oxidize part of the nitrogen monooxide to form nitrogen dioxide. Due to the large amounts of nitrogen dioxide which would be necessary therefor, this method has proved not to be feasible in general practice. Therefore ozone is introduced into the flue gases in plants presently in operation, whereby the reactive oxygen of said ozone oxidizes part of the molecules of nitrogen monooxide to form nitrogen dioxide. The desired molar ratio of nitrogen monooxide to nitrogen dioxide is set by precisely regulating the supply of ozone. The production of ozone, however, is technically complex and requires considerable amounts of energy.

It is the object of the present invention to avoid such disadvantages and to create a method which enables simple and energetically advantageous setting of the molar ratio between nitrogen monooxide and nitrogen dioxide.

In accordance with the invention, the molar ratio between NO and $NO_2$ is adjusted by injecting $NO_2$ into the gas in a controlled manner, said $NO_2$ being derived from the reaction between ammonium nitrate and a strong acid.

The nitrogen dioxide which is necessary for the method is produced in a simple manner directly from the final product of the method, i.e. ammonium nitrate. This method is simple and may be performed in one step in the reactor.

It is particularly preferable if hydrochloric acid is used as strong acid. In such a case the yield will amount to nearly 100 percent.

In accordance with a further preferable variation of this method, sulphuric acid is used as strong acid. The advantage here lies in the fact that the final product of the method is ammonium sulphate which constitutes a valuable raw material for further processes.

EXAMPLE 1

In a packed column the gas to be purified is allowed to flow from below in an upward direction. A desulphurization step by means of lime milk is performed in said packed column, said step being well known and not requiring further description. After said desulphurization step, $NO_2$ is injected into said column in order to produce a molar ratio of 1 between NO and $NO_2$. The gas treated in such a manner is led by means of a counterflow to a hydrous solution of ammonia or, possibly, ammonium nitrate. The following chemical reaction takes place in the interior of said column:

$$NO + NO_2 + 2\, NH_3 + H_2O \rightarrow 2\, NH_4NO_2 \quad (1)$$ 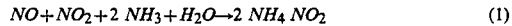

The ammonium nitrite received in such a manner is further oxidized to form ammonium nitrate:

$$2\, NH_4NO_2 + O_2 \rightarrow 2\, NH_4NO_3 \quad (2)$$ 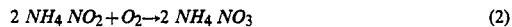

The $NO_2$ necessary for the method is obtained by splitting the ammonium nitrate by means of hydrochloric acid. The main reaction taking place may be described as follows:

$$4\, NH_4NO_3 + 2\, HCl + \tfrac{1}{2} O_2 \rightarrow 2\, NH_4Cl + 2\, NH_4NO_3 + 2\, NO_2 + H_2O \quad (3)$$ 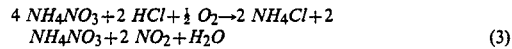

This reaction is performed in a Teflon coated generator made from titanium. The resting period in the reactor is approx. 10 minutes.

For the purpose of starting up the plant, ozone is injected into the column as hitherto known. As soon as the first ammonium nitrate is present and nitrogen dioxide has been sufficiently formed, the ozone injection is switched to $NO_2$ injection. In the case that there are several reaction towers, only one tower requires an ozone device, whereas all other towers may be started up one after the other with the $NO_2$ of the respective preceding device.

In a concretely performed project the purification of $2.17 \times 10^6$ $Nm^3$ flue gas, said gas being loaded with 500 mg/$Nm^3$ NO. Other nitrogen oxides were only present in negligible amounts. 5204 kg/h of a 50 percent solution of ammonium nitrate were produced at a flow rate of 1085 kg/h NO. In order to produce the required amount of $NO_2$, 1170 kg/h HCl were fed.

EXAMPLE 2

In a packed column the gas to be purified is allowed to flow from below in an upward direction. A desulphurization step by means of lime milk is performed in said packed column, said step being well known and not requiring further description. After said desulphurization step $NO_2$ is injected into said column in order to produce a molar ratio of 1 between NO and $NO_2$. The gas treated in such a manner is led by means of a counterflow to a hydrous solution of ammonia or, possibly, ammonium nitrate. The following chemical reaction takes place in the interior of said column:

$$NO + NO_2 + 2\, NH_3 + H_2O \rightarrow 2\, NH_4NO_2 \quad (4)$$ 

The ammonium nitrite received in such a manner is further oxidized to form ammonium nitrate:

$$2\, NH_4NO_2 + O_2 \rightarrow 2\, NH_4NO_3 \quad (5)$$ 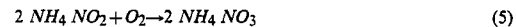

The NO₂ which is necessary for the method is obtained by splittinq ammonium nitrate by means of sulphuric acid. The main chemical reaction taking place here can be described as follows:

$$2\ NH_4NO_3 + H_2SO_4 \rightarrow 2\ HNO_3 + (NH_4)_2SO_4 \qquad (6)$$

$$2\ NH_4NO_2 + H_2SO_4 \rightarrow 2\ HNO_2 + (NH_4)_2SO_4 \qquad (7)$$

$$HNO_3 + HNO_2 \rightarrow 2\ NO_2 + 2\ H_2O \qquad (8)$$

This reaction is performed in a reactor made from austenitic steel which has an enamel coating inside. The resting period in the reactor is approx. 10 minutes.

For the purpose of starting up the plant, ammonium nitrate is fed into the reactor from a buffer store. The nitrogen dioxide which results therefrom is fed into the column. During further operation the necessary ammonium nitrate, said nitrate being mixed with ammonium nitrite, is taken from the column.

In the present example 1253 kg NO₂ were formed by using 4358 kg of a 50 percent solution of ammonium nitrate/ammonium nitrite and 3338 kg of 40 percent sulphuric acid. This resulted in 1798 kg of ammonium sulphate.

The inventive method enables an extremely economical disposal of flue gases loaded with nitrogen oxides.

I claim:

1. A method for removing nitrogen oxides selected from the group consisting of NO and NO₂ from a gas containing said oxides, which comprises the steps of
    (a) injecting NO₂ into the gas until a molar ratio of 1 between NO and NO₂ is obtained;
    (b) absorbing the thus obtained nitrogen oxides in a hydrous ammonia solution at a temperature of about 20° C. to 30° C. to obtain ammonium nitrite;
    (c) oxidizing the thus obtained ammonium nitrite to obtain ammonium nitrate;
    (d) reacting a part of the thus obtained ammonium nitrate with a strong acid selected from the group consisting of hydrochloric acid and sulfuric acid to produce NO₂; and
    (e) recirculating the thus produced NO₂ to step (a) to obtain the molar ratio of 1.

* * * * *